United States Patent [19]
Kominek

[11] 3,915,802
[45] Oct. 28, 1975

[54] DIALYSIS PROCESS AND APPARATUS

[75] Inventor: Leo A. Kominek, Portage, Mich.

[73] Assignee: The Upjohn Company, Kalamazoo, Mich.

[22] Filed: Aug. 19, 1974

[21] Appl. No.: 498,312

[52] U.S. Cl. ............... 195/80 R; 195/109; 195/115; 195/139; 195/142; 195/143; 210/21; 210/321; 195/105; 260/294.7
[51] Int. Cl.$^2$ .......................................... C12B 1/00
[58] Field of Search ............ 210/21, 22, 321; 195/1, 195/105, 115, 109, 108, 139, 142, 143, 80

[56] References Cited
UNITED STATES PATENTS

| | | | |
|---|---|---|---|
| 3,186,917 | 6/1965 | Gerhardt et al. | 195/1 |
| 3,418,208 | 12/1968 | Coty | 195/1 |
| 3,769,176 | 10/1973 | Hise et al. | 195/142 |
| 3,827,975 | 8/1974 | Bizot et al. | 210/22 |

Primary Examiner—Lionel M. Shapiro
Assistant Examiner—Robert J. Warden
Attorney, Agent, or Firm—Roman Saliwanchik

[57] ABSTRACT

A new dialysis method and apparatus is described for separating, accumulating, and recovering cycloheximide from a culture medium wherein *Streptomyces griseus* is producing the antibiotic. The new method and apparatus utilizes an aqueous pick-up medium (a diffusate) which is flowed through tubular structure of a semi-permeable membrane means through which membrane cycloheximide will diffuse from a fermentation culture medium producing the same. The flowing diffusate, having accumulated cycloheximide in its passage through the membrane structure, is discharged into a water-immiscible organic solvent where the cycloheximide is extracted from the diffusate because of its greater solubility in the organic solvent. The extracted aqueous medium collects in an aqueous phase separate from the organic solvent phase. The aqueous phase is drawn off (preferably stripped of any dissolved organic solvent) and returned to the semi-permeable membrane means for further separation and accumulation of diffusing cycloheximide and discharge into the extracting solvent. The same procedure is applicable to other biochemicals produced by microbial cultures.

13 Claims, 2 Drawing Figures

DIALYSIS PROCESS AND APPARATUS

SUMMARY OF THE INVENTION

This invention pertains broadly to microbial production of biochemicals, and apparatus for effecting separation, accumulation, and recovery of the same products. The invention is more particularly directed to a new microbial production of biochemicals wherein a semi-permeable membrane (dialysis) means is provided for continuous diffusion-separation of the desired biochemical from the culture medium. The dialysis means is characterized by a minimal volume of a flowing aqueous medium which accumulates the desired biochemical product as it diffuses through the semi-permeable membrane. The flowing aqueous medium thus carrying the desired biochemical is then discharged into a volume of a water-immiscible organic solvent wherein the biochemical is preferentially soluble. The extracted aqueous medium is collected in an aqueous phase and then returned to the semi-permeable membrane dialysis means.

In accordance with physicochemical principles of diffusion, preferential solubilities, and water-immiscibility relationships, the desired biochemical is separated from the culture medium when it crosses the dialysis membrane to the aqueous medium (diffusate) where it accumulates. It then is extracted by the organic solvent from which it can be recovered according to conventional methods. The recirculation of the aqueous pick-up medium permits continuous separation and extraction of the biochemical with a minimal volume.

The new method and apparatus thus provide a continuous removal of a desired biochemical produced by the cultured microorganism, transport to an extraction chamber, and recirculation of a relatively small volume of aqueous medium. The advantages of the new system are immediately apparent (1) product inhibition in the producing culture is minimized; (2) any degradative reactions affecting the biochemical product can be minimized; (3) overall yields of biochemical product are improved; (4) the volume of dialysis medium is minimized; and (5) nutrients and intermediates not extractable by the organic solvent are not removed.

The method and apparatus of the invention are particularly adapted to microbial production of antibiotics although other biochemicals, e.g., lactic acid are contemplated. The development of the invention was accomplished with the production of cycloheximide. Chloromycetin and other antibiotic production could be similarly improved.

Since the working embodiment of this invention involved the production of cycloheximide, some background information might be useful to those who would utilize the invention. Cycloheximide is a biochemical elaborated by certain species of microorganisms of the genus Streptomyces. Up to the present time the species S. *griseus* and S. *albulus* (ATCC 12757), S. *noursei*, S. *naraensis*, S. No. ETH 7796, Streptomyces rimosus f. paramomycinus, S. viridochromogenes, S. olivochromogenes are known to produce the compound in recoverable amounts.

Cycloheximide has the empirical formula $C_{15}H_{23}NO_4$ and is structurally identified as 3-[2-(3,5-dimethyl-2-oxocyclohexyl)-2-hydroxyethyl]glutarimide. The absolute configuration of the molecule is as follows:

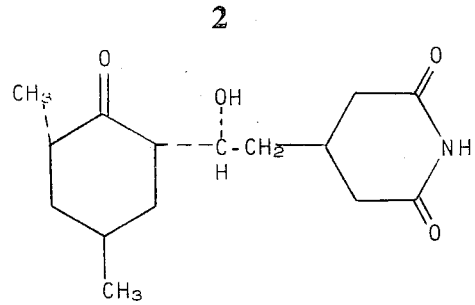

The existence of cyclohximide was first announced by A. Whiffen et al. in 1946. She observed the activity of the compound against the yeasts and it became known as the first antifungal antibiotic. The early structural identification of the compound was accomplished by Kornfeld et al. who reported their observations and data in J. Am. Chem. Soc. 71, pp. 150–159 (1949).

Very soon thereafter some practical utilities for cycloheximide as a plant disease fungicide were demonstrated, and commercial development followed. Subsequently, cycloheximide has been marketed as a plant fungicide for many years and this use continues mainly against fungal diseases of turf and for powdery mildew on roses. It has been used against cherry leave spot, white pine blister rust, and other fungal plant diseases. The biochemical is the more remarkable because it is the most powerful rodent repellent known (particularly rats). More recently, cycloheximide has been recognized and is being developed as an abscission agent for citrus fruits and olives.

Since commercial use of cycloheximide thus appears to be continuing and even expanding, and the cost of producing the biochemical by original fermentation procedures is expensive, more advanced technology seemed to be required. Applicant became interested in this objective. After some considerable exploratory research, this invention was achieved.

The invention utilizes known techniques and equipment but combines them in a new way so as to achieve the new contribution. The discovery is that a limited-volume diffusate can be utilized to pick up a diffusing biochemical which biochemical is then extracted by a water-immiscible solvent so as to continuously separate and remove a biochemical such as cycloheximide from the fermentation broth where it is produced and transfer the compound to a separate body of water-immiscible organic solvent. Further in accordance with the process of the invention the aqueous medium initially used to pick up the cycloheximide from the fermentation medium is recirculated again and again through the dialysis means so as to minimize volume relationship changes of the pick-up liquid and in the apparatus.

With the foregoing general thoughts in mind, applicant will now describe his invention as it was effectively developed at an early stage. A description of the apparatus embodiment would seem to be appropriate for a basic understanding of the new process.

Figure 2:
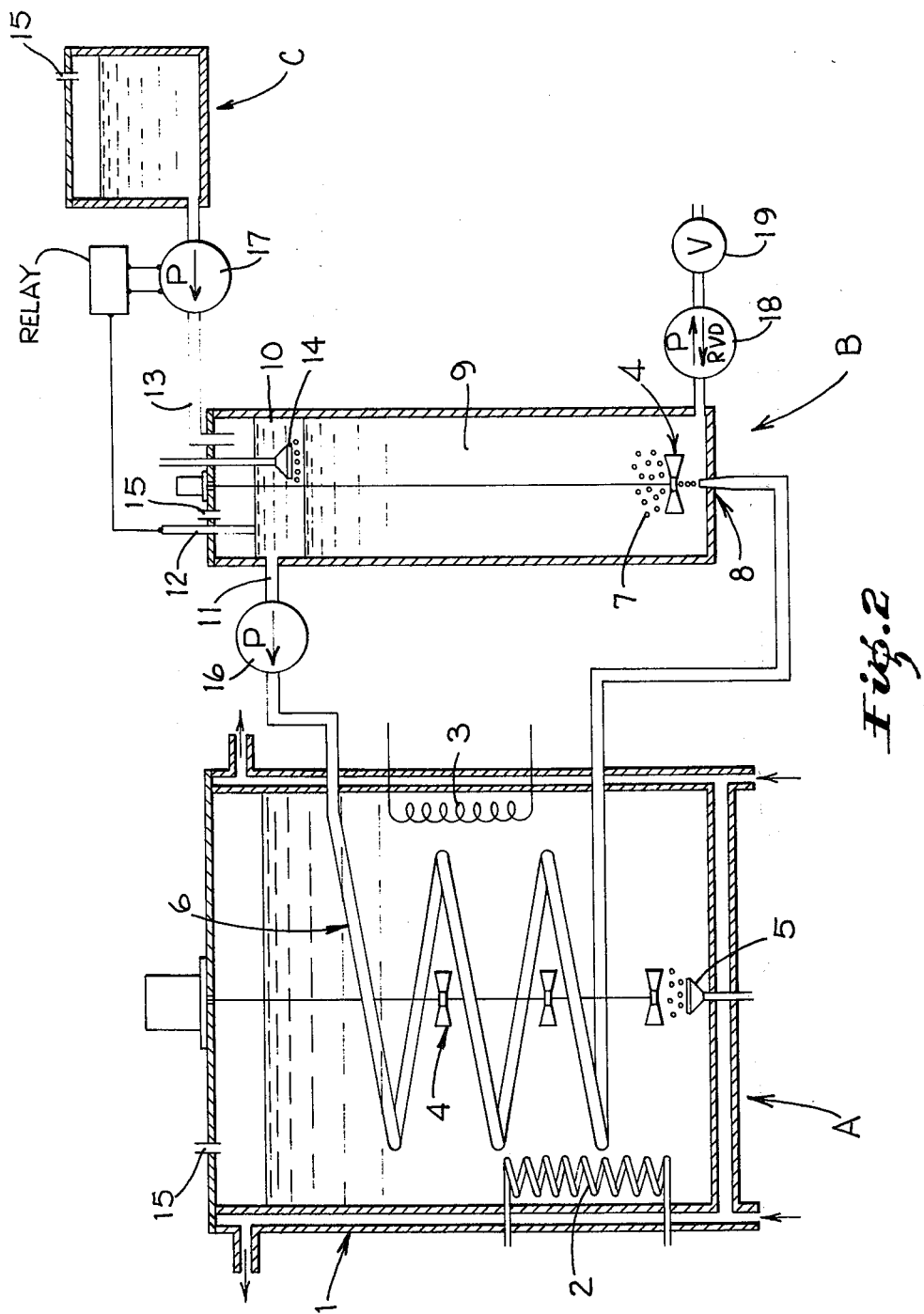
FIG. 2 shows a side view of a Dialysis - Extraction Fermentation apparatus.

A representative apparatus in accordance with the invention is shown in the drawing. The entity (A) represents a fermentor vessel where a microorganism is cultured. Such a fermentor can be of disparate sizes from, for example, 3 liters to 150,000 liters. In general, cooling means, heating means, agitation means, and aeration means are conventional. Cooling and heating of a microbial culture can be accomplished by a jacketed construction as represented by (1), or separately controlled cooling means (2) or heating elements (3) can be installed. These facilities permit optimal regulation of temperature for growth and metabolism of the microorganism.

A means for stirring agitation of the culture medium is usually advantageous, and is represented by shaft and impellers (4). Aeration, when desirable, is provided by representative means (5).

Each of the foregoing facilities are optional and not critical aspects of this invention. They are available in many different forms, designs, and materials in accordance with the preferred ideas of those practically skilled in this art.

A characteristic structure of this invention is a semipermeable membrane means (6) of tubular structure through which the aqueous pick-up medium (diffusate) is flowed. Advantageously, the tubular, semipermeable membrane means is coiled in the fermentor vessel as shown. It is there represented as passing through the wall and jacket via ports. It can be more simply extended over the rim of the vessel and down into and throughout the culture medium. Alternatively, it can be contacted with the culture medium via a shell and tube unit, such as are commercially available for dialysis purposes.

A shell and tube unit can be optionally outside the fermentor vessel; the culture medium can be pumped through a shell structure containing the tubular, semipermeable membrane connected via inlet and outlet so as to effect countercurrent flows and maximize the area for dialysis.

Referring further to the drawing, the entity (B) is the extractor vessel where the desired biochemical product is extracted from the aqueous medium (diffusate) (7) by the water-immiscible extracting solvent (9). The outlet for the diffusate (8) is advantageously located at or near the bottom of the extractor vessel in order to utilize efficiently the full length of the column of solvent. The extractor is advantageously a columnar vessel of solvent topped by an accumulating layer of the extracted aqueous medium (10), thus a two-phase system. Under appropriate circumstances, the water-immiscible solvent can be less dense that water, in which case the aqueous phase will accumulate below the solvent phase, and the outlet (8) should be at or near the top of the extracting solvent column.

The diffusate is introduced into the solvent in a stream, as discrete droplets (7), or merely flowed in and mixed by an agitator means (4), the objective being to obtain as complete transfer as practicable of the biochemical product from the aqueous diffusate to the water-immiscible organic solvent.

After extraction of the biochemical product from the aqueous diffusate by the organic extracting solvent, the extracted aqueous diffusate accumulates in an aqueous phase separated by a phase boundary from the organic solvent phase. Depending upon the solubility characteristics of the solvent in the aqueous medium, and the possible toxicity of the solvent to the enzymatic reactions or microorganisms in the microbial culture should diffusion occur from the diffusate into the fermentation culture, it might be desirable to strip any organic solvent from the aqueous phase. In the simplest case, stripping of solvent can be effected by aeration (bubbling air) into the aqueous phase.

In accordance with the apparatus embodiment, the aqueous phase in the extractor entity (B) is fitted with aeration means (14) and an air outlet means (15). In this way, air strips the organic solvent from the aqueous layer and sweeps the vapors out of the system. The solvent-stripped aqueous medium is then withdrawn into conduit (11) and transferred by pump (16) to the dialysis means contacting the fermentation medium.

If recovery of the organic solvent is advantageous and desirable, the air outlet means (15) can be connected to a conednser (not shown) which entraps the solvent from whence it can be returned to the extractor vessel. If desirable or necessary, such condenser can be connected to reservoir and suitable means for maintaining the level of organic solvent in the extractor vessel.

The apparatus as portrayed is subject to many modifications as will undoubtedly occur to those skilled in the art as they assemble the specified facilities for operation. One of the first modifications that will come in mind is the setting up of a battery of fermentor vessels to feed diffusates into one extractor entity. When this modification is utilized, there might well be means for continuously removing product concentrated zones of organic solvent, or means for batchwise removing product concentrated organic solvent and replacing it with fresh solvent.

Another component of the apparatus can be a reservoir of sterile water (C) for maintaining the volume of diffusate should there be any loses. This facility is represented by a constant level probe (12), a connecting conduit (13), and a relay that will activate aqueous medium supply pump (17) when the level drops, and optionally, diffusate return pump (16). Advantageously, an aqueous solution of solutes characteristic of the fermentation medium is stored in reservoir (C) so that substantial isotonicity with the culture medium is possible. The latter situation is preferable even though there would usually not be significant change in the culture medium due to movement across the semi-permeable membrane and subsequent extractions of the diffusate.

When the organic extracting solvent contains an advantageous concentration of the biochemical product, it can be removed from the extractor vessel via discharge and supply pump (18) in conjunction with valve (19). The extractor vessel can be recharged with organic solvent in the same or a similar way. These operations are not critical as indicated above. Various techniques and conventional facilities can be utilized to withdraw the body organic solvent having the desired biochemical dissolved therein.

In its broadest aspects, the invention consists of the use of limited-volume dialysis to remove the desired solute, such as cycloheximide, continuously from the fermenting medium into an aqueous pick-up fluid and subsequent solvent extraction and recovery of the solvent, with recycling of the pick-up liquid. Although the operation of the invention is easily described, as above, by the use of dialysis tubing membrane, other physical arrangements to accomplish these results can also be envisioned and are included in the invention. Thus, for example, in place of dialysis tubing an array of individual chambers separated from each other by semipermeable dialysis membranes, alternate chambers containing fermenting medium and pick-up fluid, the chambers of the pick-up fluid being interconnected, if desired; and with provision of means for continuous flow of the pick-up fluid and its continuous extraction, and recycling, as above, can also be used. In such an arrangement, the chambers of fermenting medium can, if desired, also be interconnected and provided for continuous flow, with provision for aeration and stirring, if needed.

Another embodiment of the dialysis means is one characterized by proximate convoluted semipermeable membranes spaced relatively closely together to form a narrow channel. The surfaces of membranes away from the channel help to form relatively larger spaces for circulation of fermentation medium on both sides of the membrane delineated channel. In this dialysis means, the aqueous pick-up medium (diffusate) is flowed in the narrow channel between the proximate membranes thus accumulating the desired, diffusing biochemical product. From the channel, the diffusate is flowed to the extractor vessel where the biochemical is extracted and recovered in accordance with the invention.

The spacing of the membranes can vary according to the size of the fermentor vessel and the volume of fermentation medium for circulation through the relatively larger volume spaces. When larger volumes of fermentation medium are available the narrow channel can be somewhat wider so that greater volumes of pick-up medium can be circulated and diffusing product carried away from medium-membrane interfaces.

As a first approximation, the channelar space between the semi-permeable membranes can be one-eighth to one-half inch. The space can be connected to enlarged portions which interconnect with pipes or tubing which transport the diffusate to the extractor and return it for recurrent pick up.

The following examples are illustrative of the process and prducts of the present invention but are not to be construed as limiting.

EXAMPLE 1

At an early stage of the development of this invention, three liters of a sterile nutrient medium having the following composition:

| | |
|---|---|
| Glucose | 60 g./l. (Clintose) |
| Soybean meal | 14 g./l. (Kaysoy 200C) |
| Yeast | 2.5 g./l. |
| $(NH_4)_2SO_4$ | 5 g./l. |
| $CaCO_3$ | 8 g./l. |
| NaCl | 4 g./l. |
| $KH_2PO_4$ | 0.2 g./l. | was warmed in a 3 liter fermentor to 25° C. and then inoculated with a 5 percent seed (described below) *Streptomyces griseus*. The inoculated medium was maintained at 25° C., stirred (700 r.p.m.) and aerated (1.5 slm) for 2 days while the microorganism propagated. On the second day, an incremental glucose feed was initiated at the rate of 60 ml. per day in the form of sterile, aqueous glucose solution (600 g./l.). Also on the second day, the dialysis procedure was initiated. This practice involved pumping sterile, distilled water through a Visking cellulose tubing which was 8 mm. in diameter and long enough to provide 500 $cm^2$ of surface area. The tubing had a wall thickness of 0.0020 in. and the average pore radius was 24A. The distilled water was pumped through the tubing at the flow rate of 40 ml. per minute. The total volume of water (as diffusate) was about 180 ml.

The diffusate in the dialysis tubing was conducted through glass tubing to an extraction vessel containing methylene chloride which is an excellent and preferred one for cycloheximide. The glass tubing was so constricted to an orifice near the bottom of the extraction vessel as to effect droplet by droplet dispersion of the diffusate into the methylene chloride. The extraction vessel was itself a 1 liter graduated cylinder, and it contained 900 ml. methylene chloride (bottom phase) and 100 ml. sterile, distilled water (top phase). The droplets of diffusate passed upward through the methylene chloride, the cycloheximide was extracted, and the extracted aqueous diffusate collected in the aqueous layer of the extraction vessel. From there it was pumped to a solvent evaporator vessel where heat and aeration effected the stripping of methylene chloride from the aqueous medium. The solvent evaporator was heated to 55° C. and aerated at 3.0 slm. The stripped aqueous medium was then recirculated as pick-up fluid to the dialysis means.

After operation of this system for 194 hours (8.1 days) the fermentation yielded an increase of 80.4 percent in cycloheximide content when compared to an identical fermentation not subjected to dialysis removal.

Other comparable fermentation cultures treated in the same manner, but kept active for 10 days produced increased cycloheximide yields of 100–106 percent above the non-dialyzed control fermentation.

Figure 1:
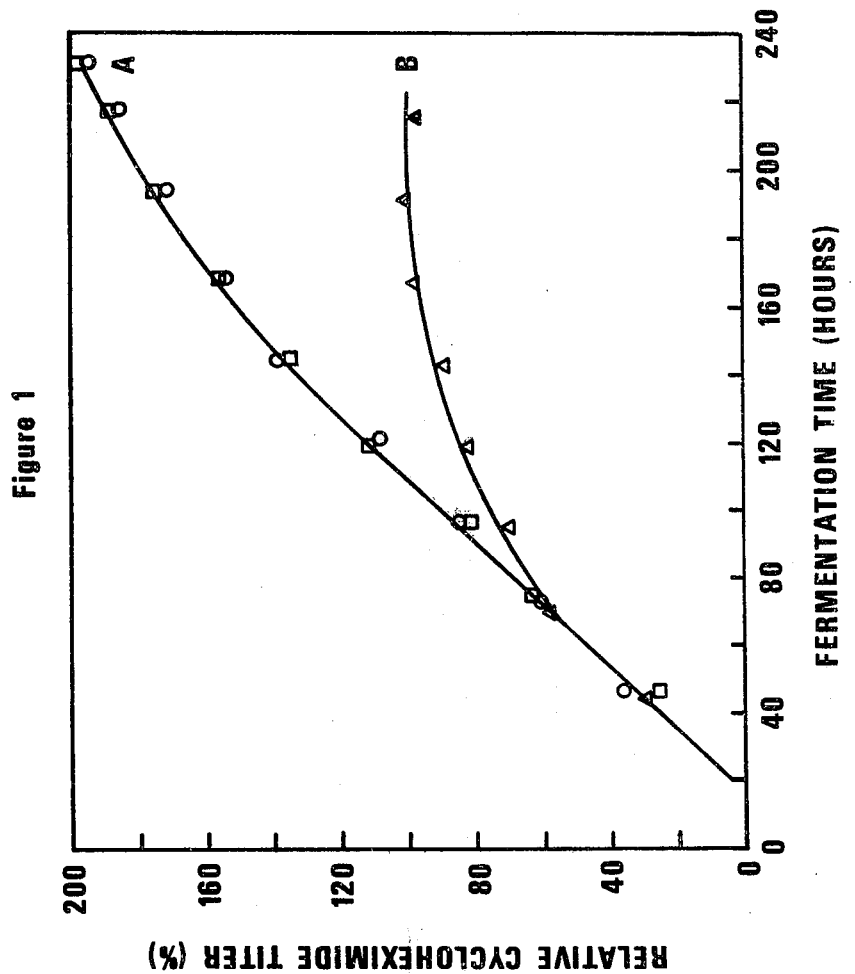
FIG. 1 shows a comparison of Cycloheximide Production in a Standard and a Dialysis - Extraction Fermentation.

FIG. 1 - Comparison of Cycloheximide Production in a Standard and a Dialysis-Extraction Fermentation. A) Glucose fed fermentation with continuous dialysis-extraction. Cycloheximide was determined by chemical assay (o) and the microbiological assay (□). B) Standard fermentation with a glucose feed. Cycloheximide was determined by the microbiological assay (+). The *Streptomyces griseus* inoculum used in the foregoing Example was prepared as follows: The microorganism was maintained on agar slants of the following composition:

| | |
|---|---|
| Glucose | 10 g. |
| Yeast | 10 g. |
| Agar (Bacto) | 15 g. |
| Distillers Solubles | 5 g. |
| KCl | 4 g. |
| Tap water to make | 1000 ml. |

Spores from these slants were suspended in distilled water and inoculated into a seed medium of the following composition:

| | |
|---|---|
| Glucose | 10 g. |
| Beef extract | 5 g. |
| Peptone | 5 g. |
| NaCl | 5 g. |
| Tap water to make | 1000 ml. |

This inoculated seed medium was incubated at 28° C. for 2 days on a reciprocating shaker. A volume of 150 ml. of this seed medium is adequate inoculation for a 3000 ml. fermentation culture (5 percent).

Cycloheximide concentration in fermentation beer was determined by microbiological assay or a colorimetric assay. For the colorimetric assay 10 ml. whole beer was extracted with 25 ml. of butyl acetate for 10 minutes and then centrifuged. A suitable aliquot of the solvent layer was removed, taken to dryness, and used in the colorimetric assay described by Takeshita et al. [Takeshita, M., H. Takahashi and T. Ikuda, Studies on Streptomyces Antibiotic, Cycloheximide, XIII, New Spectrophotometric Determination of Cycloheximide, Chem. and Pharm. Bull, 10, 304–308 (1962)]. This method is based on the reaction of cycloheximide with resorcinol. Related compounds such as isocycloheximide and anhydrocycloheximide give full response in this assay but neither compound is present in significant amounts in the fermentation beer.

Microbiological assays were performed using the platedisc method with S. cereviseae as the test organism. Agreement between chemical assay and bioassay was good. Qualitative estimation of cycloheximide was performed by thinlayer chromatography. After extraction of the whole beer as described above, an aliquot of the solvent was taken to dryness and redissolved in acetone. The acetone solution was spotted on a silica gel GF plate to contain 50–200 $\mu$. cycloheximide per spot. The solvent system used for development was isopropanol:ethyl acetate (2:98) and detection was accomplished by spraying with the folloiwng solution:

| Molybdic acid | 2.5 g. |
| Ceric sulfate | 1.0 g. |
| $H_2SO_4$ | 11.8 ml. |
| $H_2O$ | 88.0 ml. |

After spraying the plates were heated and cycloheximide appeared as a blue spot on a white background with an Rf of 0.7.

Glucose was determined enzymatically by the Glucostat method (Worthington Biochemical Corp., Freehold, New Jersey).

The results described in Example 1 are representative of the enhanced yields of cycloheximide that are obtained by the process of this invention. The advantages are clearly significant. Variations in the process can be made and the enhanced yields will still be realized.

Illustratively, the semi-permeable dialysis tubing can have variable pore sizes. The rate of diffusion of cycloheximide across the tubing wall will depend upon the size of pores in the membrane, as well as the difference in concentrations. The cellulose dialysis tubing of the Example had an average pore radius of about 24A.

Cellulose membranes of larger or smaller pore size can be used. cycloheximide diffusion rates might be increased or retarded somewhat. Variations in flow rates might compensate for changes of pore size.

Organic polymer membranes, available in the art, are contemplated, such as collodion membranes (nitrocellulose), cellulose ester membranes (cellulose acetate), and vinyl ester films. In general the invention contemplates average pore sizes ranging from 2 millimicrons to about 400 millimicrons or more. A cellulosic membrane pore of radius of 2 to 5 millimicrons (20A to 50A) is preferred.

Variation of the procedure is to eliminate the stripping of the methylene chloride solvent from the extracted aqueous diffusate. This variation is applicable to the Example - embodiment of the invention because methylene chloride is only slightly soluble in water, it is essentially non-toxic in low concentrations to *S. griseus*, and there would appear to be only insubstantial effects to the particular microorganism caused by any counter diffusion of methylene chloride from the diffusate medium into the fermentation medium. The use of this solvent would seem not to require stripping. If a more toxic organic solvent were used, stripping would probably be a necessity.

Still another variation would be to have the aqueous pick-up medium isotonic initially with respect to the microbioculture medium by having the same concentrations of solutes therein. Hence, a contemplated embodiment of the invention is one wherein the medium contains the same species and concentrations of solutes except cycloheximide as the culture medium itself.

The flow rate of aqueous medium through the dialyzer means can be varied as indicated. A faster flow rate can be coordinated with a larger cross sectional area of tubing of lesser surface area. An conversely, a slower flow rate can be effected through smaller bore tubing of greater total surface area.

The functional desiderata of the dialysis tubing is to prevent or minimize diffusion of living cells, macromolecules, e.g., proteins, and nutrient components from the culture medium into the dialysis medium, but still permit reasonably good diffusion of cycloheximide or other biochemical being separated and recovered. The tubing should be strong enough to withstand agitation and pressure gradients. In the Example described, the dialyzate is pumped under pressure through the dialyzer tubing. On the other hand, the dialyzate can be drawn through the tubing under reduced pressure.

Solvents other than methylene chloride can be used so long as they are immiscible with water and are strong solvents of cycloheximide. Representative suitable solvents are ethyl acetate, butyl acetate, chloroform, and diethyl ether. Methylene chloride is preferred, however, because it is relatively inexpensive, non-toxic, nonflammable, easy to remove by evaporation, and recoverable. The reason methylene chloride was chosen is that it is denser than water and fits the apparatus used. Other solvents less dense than water could be used in the apparatus simply by reversing the phases in the extractor, i.e., aqueous on the bottom, solvent on the top with suitable repiping.

The minimal volume of diffusate for circulation through the tubular structure of a semi-permeable membrane means can be varied somewhat. In accordance with the objectives of the invention a practical minimal volume is used. In general, such volume would be 1/30 to 1/6 of the volume of the culture medium. A preferred range of proportions is about 2 to 10 percent of the volume of the culture medium.

I claim:

1. The process for separating and recovering a desired biochemical product from a fermentation culture medium wherein the product is being produced, which comprises: contacting a tubular, semi-permeable membrane means with the culture medium so that the product diffuses across the membrane into an aqueous medium flowing in the membrane means, extracting of the product from the aqueous medium by a water-immiscible organic solvent, accumulating of the extracted aqueous medium in an aqueous phase, with the biochemical product remaining in the organic solvent phase and withdrawing the aqueous phase for purposes of optionally stripping organic solvent from it, and recycling it to the tubular, semipermeable membrane means.

2. The process according to claim 1 wherein the desired biochemical product is an antibiotic soluble in water, but preferentially soluble in a water-immiscible organic solvent.

3. The process according to claim 2 wherein the antibiotic is cycloheximide.

4. The process according to claim 3 wherein the water-immiscible organic solvent is methylene chloride.

5. The process according to claim 4 wherein the semi-permeable membrane is tubular cellulosic.

6. The process according to claim 5 wherein the mean pore diameter is in the range of 20A to 50A.

7. The process according to claim 6 wherein the surface area of semi-permeable membrane is about 500 cm$^2$ per 3 liters volume of fermentation medium.

8. The process according to claim 7 wherein the volume of aqueous medium is from about 2 percent to about 10 percent of the volume of culture medium.

9. The process according to claim 8 wherein the volume is 6 percent.

10. A combination of equipment for producing, separating, accumulating, and recovering a biochemical product which comprises (a) a first vessel containing a volume of a fermentation culture actively producing a desired biochemical product that is preferentially soluble in a water-immiscible organic solvent; (b) a dialysis means consisting of a tubular semi-permeable membrane means in which an aqueous medium is flowing and through which tubular semi-permeable membrane means the biochemical product from said first vessel will diffuse; (c) a second vessel containing a characterizing volume of a water-immiscible organic solvent into which said aqueous medium flowing in said tubular semi-permeable membrane means is discharged, said solvent volume being further characterized by a cross-sectional aqueous phase boundary; and (d) recirculating means connecting said aqueous phase with said tubular semi-permeable membrane means.

11. An apparatus characterized according to claim 10 wherein the tubular, semi-permeable membrane is cellulosic with a mean pore diameter of 20A to 50A and the surface area is about 500 cm$^2$ per 3 liters volume of fermentation culture.

12. An apparatus characterized according to claim 11 wherein the semi-permeable membrane means is immersed directly in the culture medium.

13. An apparatus characterized according to claim 12 wherein the aqueous medium is discharged into a second vessel containing a chlorinated hydrocarbon solvent for cycloheximide of greater density than water.

* * * * *

UNITED STATES PATENT AND TRADEMARK OFFICE
CERTIFICATE OF CORRECTION

PATENT NO. : 3,915,802
DATED : October 28, 1975
INVENTOR(S) : Leo A. Kominek

It is certified that error appears in the above-identified patent and that said Letters Patent are hereby corrected as shown below:

Column 2, line 11, for "cyclohximide" read -- cycloheximide --.
Column 4, line 18, for "conednser" read -- condenser --.

Column 7, line 25, for "50-200μ." read -- 50-200μg. --; line 28, for "folloiwng" read -- following --;
line 54, for "cycloheximide" read -- Cycloheximide --;

Column 8, line 63, for "extracting of the" read -- extracting the --; line 65, for "accumulating of the" read -- accumulating the --.

Signed and Sealed this first Day of June 1976

[SEAL]

Attest:

RUTH C. MASON
Attesting Officer

C. MARSHALL DANN
Commissioner of Patents and Trademarks